United States Patent [19]

Berkey et al.

[11] Patent Number: 5,149,349
[45] Date of Patent: Sep. 22, 1992

[54] METHOD OF MAKING POLARIZATION RETAINING FIBER WITH AN ELLIPTICAL CORE, WITH COLLAPSED APERTURES

[75] Inventors: George E. Berkey, Pine City; Robert M. Hawk, Bath; Steven H. Tarcza, Painted Post, all of N.Y.

[73] Assignee: Corning Incorporated, Corning, N.Y.

[21] Appl. No.: 728,276

[22] Filed: Jul. 11, 1991

[51] Int. Cl.$^5$ ............................................ C03B 37/023
[52] U.S. Cl. ...................... 65/3.11; 65/3.12; 65/18.2
[58] Field of Search .............. 65/3.11, 3.12, 31, 3.2, 65/18.2; 385/146, 11, 123; 156/663

[56] References Cited

U.S. PATENT DOCUMENTS

| | | | |
|---|---|---|---|
| 4,395,270 | 7/1983 | Blankenship | 65/3.11 |
| 4,493,530 | 1/1985 | Kajioka | 350/96.34 |
| 4,561,871 | 12/1985 | Berkey | 65/3.12 |
| 4,709,986 | 12/1987 | Hicks | 65/3.11 |
| 4,859,223 | 8/1988 | Kajioka | 65/3.12 |
| 4,978,377 | 12/1990 | Brehm | 65/3.11 |

FOREIGN PATENT DOCUMENTS

| | | | |
|---|---|---|---|
| 2930704 | 2/1981 | Fed. Rep. of Germany | 65/3.2 |
| 0145632 | 8/1983 | Japan | 65/3.2 |

OTHER PUBLICATIONS

Kingery et al., Introduction to ceramics, 1976, pp. 469–470, 501, John Wiley & Sons, ed.

Primary Examiner—W. Gary Jones
Assistant Examiner—John Hoffmann
Attorney, Agent, or Firm—William J. Simmons, Jr.

[57] ABSTRACT

Disclosed is a method of making a polarization retaining single-mode optical fiber. There is initially formed a draw blank having diametrically opposed longitudinal apertures in the cladding glass parallel to the core glass region. The draw blank is drawn into a fiber under such conditions that the apertures close as the fiber is being drawn. The flow of surrounding glass, including the core glass region, toward the collapsing apertures, causes the core to assume an elliptical shape. The apertures are of such cross-sectional area and spacing from the core that the core develops the desired aspect ratio.

17 Claims, 2 Drawing Sheets

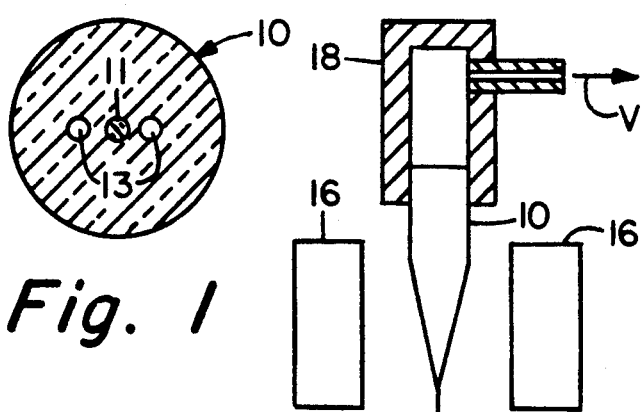
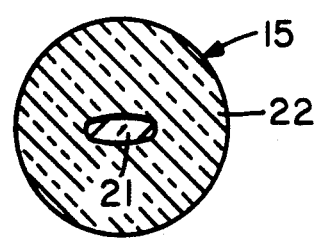
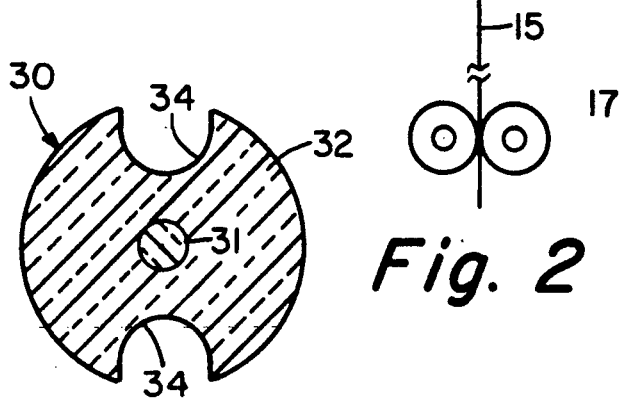
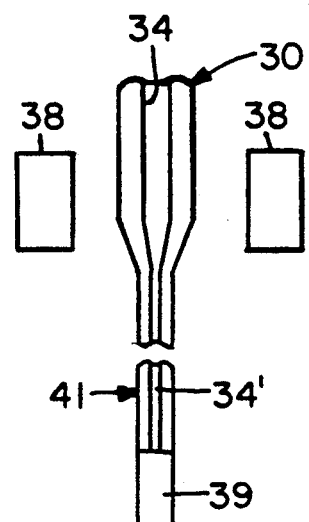
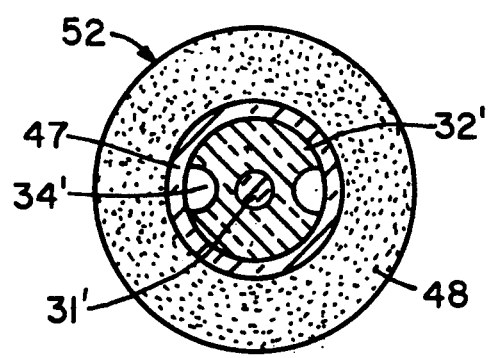
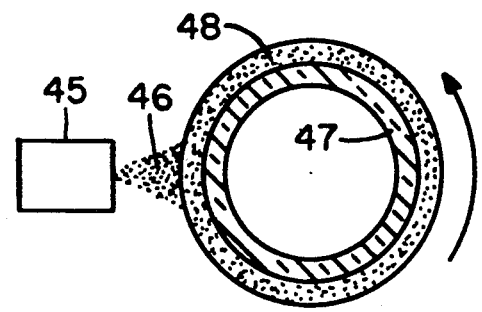

METHOD OF MAKING POLARIZATION RETAINING FIBER WITH AN ELLIPTICAL CORE, WITH COLLAPSED APERTURES

BACKGROUND OF THE INVENTION

This invention relates to the fabrication of polarization retaining single-mode (PRSM) optical fibers and more particularly to the fabrication of preforms from which fibers having elliptically-shaped cores can be drawn.

In many applications of single-mode optical fibers, e.g. gyroscopes, sensors and the like, it is important that the propagating optical signal retain the polarization characteristics of the input light in the presence of external depolarizing perturbations. This requires the waveguide to have an azimuthal asymmetry of the refractive index profile.

One of the first techniques employed for improving the polarization performance of single-mode fibers was to distort the symmetry of the core. One such optical fiber is disclosed in the publication by V. Ramaswamy et al., "Influence of Noncircular Core on the Polarization Performance of Single Mode Fibers", Electronics letters, Vol. 14, No. 5, pp. 143-144, 1978. That publication reports that measurements made on such fibers indicated that the noncircular geometry and the associated stress-induced birefringence alone were not sufficient to maintain polarization in single-mode fibers.

Fiber cores having a relatively high aspect ratio are required to obtain adequate polarization retaining properties. A high core/clad $\Delta$ also improves these properties. Techniques which have been developed for improving core ellipticity are subject to various disadvantages. Some techniques are not commercially acceptable because of their complexity. Double crucible techniques result in fibers having relatively high attenuation. Some techniques employ very soft glasses for certain fiber portions, and those soft glasses are detrimental to the propagation of light at long wavelengths where the core glass would normally experience extremely low attenuation. Soft glasses can also complicate the fusion splicing of fibers, since the soft glass flows too readily when the fibers are heated during the splicing operation.

SUMMARY OF THE INVENTION

It is therefore an object of the invention to provide a method of making PRSM optical fibers which overcomes the disadvantages of the prior art. A further object is to provide a PRSM fiber producing method which is relatively simple to practice and which can employ glasses which do not detrimentally affect light attenuation. Yet another object is to provide a method that can produce PRSM fibers, the outer surfaces of which are either round or flattened, depending upon the requirements of the particular product.

In accordance with the present method, a polarization maintaining single-mode optical fiber is formed by drawing a fiber from a draw blank having a glass core surrounded by cladding glass containing apertures that are diametrically opposed with respect to the core. The fiber is drawn at such a rate and temperature that the apertures close and the core becomes elliptical. Draw rate can be increased by evacuating the apertures during drawing. Core ellipticity can be controlled by controlling the cross-sectional area of the apertures as well as the spacing between the core and the apertures in the draw blank. Furthermore, the drawn fiber can be formed with a circular cross-section or one having opposed flattened sides, depending on the size of the apertures and their spacing from the core.

In a preferred method of making the draw blank, longitudinal grooves are formed on diametrically opposed sides of a cylindrically-shaped core preform in which the glass core is surrounded by the cladding glass. The core preform is inserted into a glass tube, and the tube is collapsed and fused to the grooved core preform to form an assembly having longitudinal apertures on opposite sides of the core.

During the step of shrinking the tube onto the grooved core preform, it is advantageous to apply a differential pressure across the tube, whereby the pressure on the outer surface exceeds that on the inner surface. This can be accomplished by depositing glass particles on the outer surface of the tube, heating the resultant assembly to consolidate the particles, the process of consolidating the particles exerting a force radially inwardly on the tube, thereby causing the tube to shrink onto the core preform, the step of heating also fusing the tube to the core preform.

The cross-sectional size of the apertures can be precisely controlled by initially forming the apertures smaller than desired and thereafter enlarging the cross-sectional area of the apertures while checking their dimensions. Aperture enlargement can be accomplished by flowing an etchant therethrough.

BRIEF DESCRIPTION OF THE DRAWINGS

FIG. 1 is a cross-sectional view of a preform from which an elliptical core PRSM fiber can be drawn.

FIG. 2 is a schematic diagram illustrating the drawing of a PRSM fiber from the preform of FIG. 1.

FIG. 3 is a cross-sectional view of a PRSM fiber produced by the present method.

FIG. 4 is a cross-sectional view of a grooved core preform.

FIG. 5 is a schematic diagram illustrating the drawing of a rod from the grooved core preform of FIG. 4.

FIG. 6 illustrates the application of a coatings of glass particles to a glass tube.

FIG. 8 is a cross-sectional view taken along lines 8—8 of FIG. 7.

DESCRIPTION OF THE PREFERRED EMBODIMENT

Figure 7:
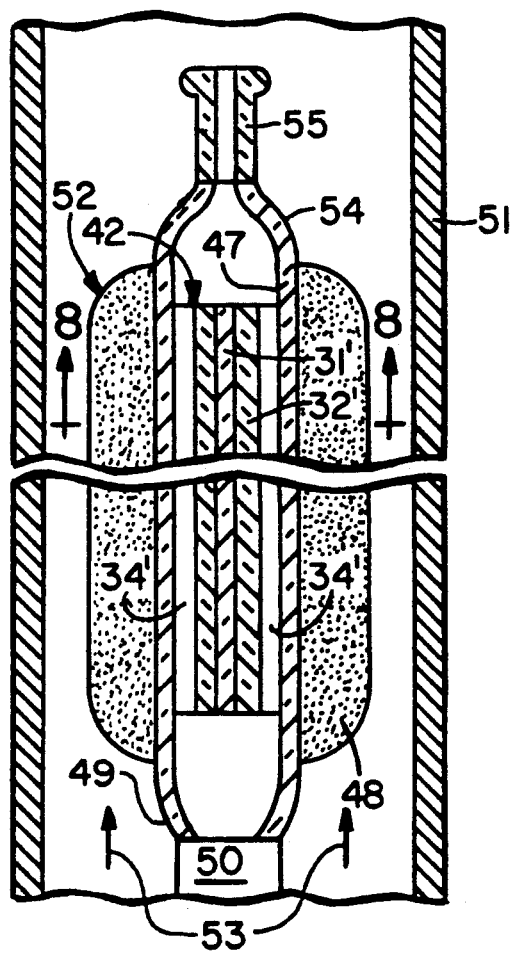
FIG. 7 is a cross-sectional view illustrating the consolidation and fusion of a first assembly.

It is to be noted that the drawings are illustrative and symbolic of the invention, and there is no intention to indicate scale or relative proportions of the elements shown therein.

Draw blank 10 of FIG. 1, from which a PRSM fiber can be drawn, has core and cladding regions 11 and 12, respectively. The core and cladding regions may be formed of conventional materials employed in the formation of optical waveguides. The salient characteristics of these materials are that the refractive index of the core material must be greater than that of the cladding material and that both materials must exhibit low losses at the wavelength at which the waveguide is intended to be operated. By way of example only, core region 10 may consist of pure silica or silica containing one or more dopants which increase the refractive index thereof. Region 11 may consist of pure silica, silica containing a lesser amount of dopant than core region 11, or silica containing one or more dopants, at least one of which is an oxide of an element such as boron or fluorine which lowers the refractive index of silica. Although silica is a preferred base glass because it exhibits low loss at useful wavelengths, base glass materials other than silica may be employed.

Apertures 13 extend longitudinally through blank 10 parallel to core region 11. While apertures 13 are illustrated as being circular in cross-section, the cross-sectional configuration could be crescent shaped, D-shaped, or the like. Any shape that results in the desired cross-sectional elongation of the core during fiber draw is considered to be suitable.

Referring to FIG. 2, draw blank 10 is placed in a conventional draw furnace where tractors 17 pull fiber 15 from the bottom portion of blank 10 which is heated to draw temperature by heating elements 16. The tendency for apertures 13 to close is a function of draw rate and glass viscosity. The viscosity of the draw blank root from which the fiber is drawn depends upon furnace temperature and glass composition. If the viscosity of the heated portion of the blank is sufficiently low and the draw rate is sufficiently low, apertures 13 will naturally close during the draw process. Since the apertures more readily close if they are evacuated, draw speed can be increased by affixing a vacuum attachment 18 to the upper end of the blank. Vacuum also reduces the possibility of core contamination by hydroxyl groups during the high temperature fiber draw step.

As apertures 13 close, they are replaced by the surrounding glass. When glass at smaller radii than the apertures flows radially outwardly into the apertures, core region 11 becomes elongated in cross-section. The resultant PRSM fiber 15, the cross-section of which includes cladding 22 and oblong core 21 is shown in FIG. 3. The ellipticity or aspect ratio of the elliptical core is the ratio of its major dimension to its minor minor dimension in a plane perpendicular to the fiber axis. Cores of varying degrees of ellipticity can be made depending on the size of apertures 13 and the spacing between those apertures and the core. Assume that in draw blank 10 of FIG. 1, apertures 13 have an area A and a spacing S between each aperture and core 11. Assume further that these parameters result in a core ellipticity of X:1. If S is increased, and all other parameters remain the same, fiber core ellipticity will be less than X:1. If A is increased, and all other parameters remain the same, core ellipticity will be greater than X:1. Suitable values of ellipticity can be obtained with values of A and S that are sufficiently small that the drawn fiber retains the circular shape of the preform. Circular fibers are preferred for certain applications.

Ellipticity can also be X:1 at some spacing slightly greater than S and some area slightly greater than A. However, at some value of S, and at a corresponding value of A needed to achieve a desired ellipticity, the outer surface of the preform will begin to collapse inwardly to such an extent that the fiber will be out-of-round. This feature may have utility for certain applications; for example, the outer surface of the fiber can be used to orient the direction of the major axis of the core.

Apertures 13 must be parallel to the core and uniform in diameter and radius throughout the longitudinal axis of draw blank 10 if fiber 15 is to have uniform properties throughout its length. Any conventional technique that meets these requirements can be used for forming the apertures. UK Patent Application GB 2,192,289 teaches two techniques for forming longitudinal holes in a preform on opposite sides of the core:

(1) The holes can be drilled with a diamond drill.
(2) A core preform having opposed flattened sides is placed in the center of a glass tube, and two glass rods are placed on opposite sides of of the core preform, leaving two opposed unfilled regions between the core preform and the tube. The resultant assembly is drawn to reduce the diameter thereof and to cause the glass members to fuse together to form an article that has a solid cross-section except for two opposed axe-head shaped holes that correspond to the unfilled regions.

A preferred method of making draw blank 10 is illustrated in FIGS. 4–10. Referring to FIG. 4, there is initially provided a glass single-mode core preform 30, i.e. a preform in which the ratio of the diameter of core 31 to the diameter of cladding 32 is greater than that which is required to draw a single-mode fiber from the preform. In order to form a single-mode optical fiber from such a core preform, it is conventionally overclad with additional cladding glass to provide the desired ratio of core diameter to cladding diameter. Preform 30 can be made by any known technique such as modified chemical vapor deposition (MCVD), vapor axial deposition (VAD) and outside vapor deposition (OVD). The refractive index profile of the core can be step-type, graded or the like.

Longitudinally-extending grooves 34 are formed in cladding 32 on opposite sides of core 31 by means such as grinding, sawing or the like. After the grinding operation, the grooved preform is preferably etched and rinsed to remove particulate matter. If the diameter of the grooved core preform is too large for subsequent processing, it is inserted into the apparatus of FIG. 5, a conventional draw furnace where its tip is heated by means 38. One end of silica rod 39 is fused to the lower end of the preform, and the other end of the rod is engaged by motor-driven tractor 40. A grooved rod 41 having a core 31', cladding 32' and longitudinal grooves 34' is drawn.

An end 49 of cladding tube 47 is tapered as shown in FIG. 7, and a glass plug 50 is fused to the tapered end. Referring to FIG. 6, the ends of tube 47 are then mounted in a lathe where it is rotated and translated with respect to soot deposition means 45. Particles 46 of glass soot are deposited on tube 47 to build up coating 48. Soot 46 preferably has the same composition as tube 47.

As shown in FIG. 7, a section 42 of the grooved rod 41 is inserted into the end of tube 47 opposite tapered end 49 until it contacts the tapered end, thereby forming assembly 52. End 54 of tube 47 is tapered and is then fused to handle 55. While assembly 52 is lowered into consolidation furnace muffle 51, a drying gas flows upwardly through the muffle (arrows 53). The drying gas conventionally comprises a mixture of chlorine and an inert gas such as helium.

Figure 9:
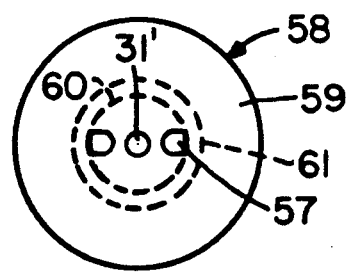
FIG. 9 is a cross-sectional view of a preform resulting from the consolidation/fusion step illustrated in FIG. 7.

As soot coating 48 consolidates, it exerts a force radially inwardly on tube 47, thereby forcing that tube inwardly against section 42. A lower density soot will provide a greater force; however, the soot coating must be sufficiently dense to prevent cracking. As shown in FIG. 9, the resultant consolidated assembly 58 comprises core 31' surrounded by cladding 59. The original cladding region 32' and tube 47 are completely fused at dashed line 60. Porous glass coating 48 has become completely consolidated and fused to tube 47 as indicated by dashed line 61. Grooves 34' have become apertures 57 which are parallel to the longitudinal axis of assembly 58.

Figure 10:
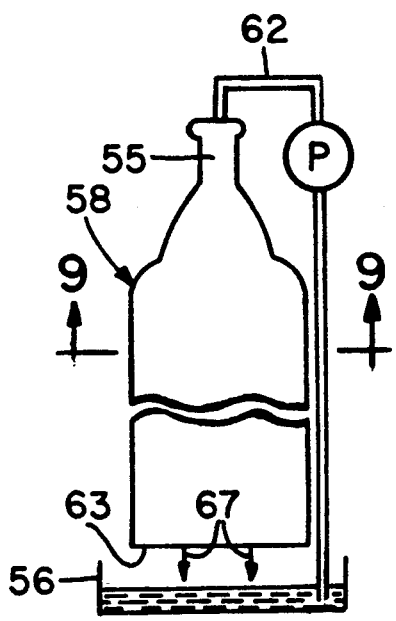
FIG. 10 is a cross-sectional view illustrating the circulation of etchant through the apertures of preform.

After consolidation, the bottom end of assembly 58 is severed to form endface 63 (FIG. 10). Consolidated assembly 58 can be drawn directly into a fiber if the cross-sectional areas of apertures 57 are sufficiently large. If the cross-sectional areas of apertures 57 are too small, they can be enlarged by flowing a liquid etchant such as HF through them. Etchant is pumped from reservoir 56 into tube 62 that is affixed to handle portion 55 of consolidated assembly 58. The etchant flows through apertures 57, and, as indicated by arrows 67, it flows back into reservoir 56 from which it is recirculated by pump P. Assembly 58 can be periodically removed from the etching apparatus and checked with a tapered gauge to ascertain the size of the apertures.

In an alternative aperture etching method, the consolidated preform is lowered into a consolidation furnace muffle while an etchant gas such as $NF_3$, $SF_6$ or the like flows through the handle, into the top of tube 47 and through apertures 34', thereby etching and enlarging the aperture walls. The etchant $SF_6$ is preferred since it acts more slowly, thus providing greater control. A preferred furnace for this process is the scanning consolidation furnace disclosed in U.S. Pat. No. 4,741,748. Such a furnace is capable of providing a sharp hot zone, and its temperature is readily adjustable. The size of the aperture formed by the etching process depends on temperature, etchant flow rate and rate at which the heating coil scans upwardly along the preform.

The resultant draw blank is inserted in a draw furnace, and a vacuum attachment is connected to handle 55. The lower end of the blank is then sealed; this can be accomplished by heating the end of the blank and dropping a gob therefrom. The apertures are then evacuated, and the fiber is drawn.

The combined thicknesses of tube 47 and soot coating 48 are sufficient that, when those glass layers are combined with the thickness of preform cladding layer 32, the resultant optical fiber exhibits the desired single-mode properties. The thickness of cladding layer 32 is sufficient to locate apertures 34' the proper distance from core 31'. This distance depends upon the desired aspect ratio of the resultant fiber core.

Instead of employing soot coating 48 to exert the necessary force to cause complete fusion of tube 47 to preform 30, a low level vacuum could be applied to tube 47 while the assembly of core preform 30 and tube 47 is gradually inserted into a furnace having a narrow hot zone. This can be accomplished by affixing a vacuum attachment to one end of the assembly, and sealing the grooves at the opposite end. Alternatively, the ends of tube 47 could be sealed in a chamber that applies pressure to the outside walls of the tube. As tube 47 is heated, the pressure collapses it onto preform 30.

The aperture forming technique of FIGS. 4–10 is advantageous in that it creates accurately sized apertures that are parallel to the longitudinal axis of the draw blank. Aperture shapes such as square, U-shaped, V-shaped or the like, can be formed by initially forming the appropriately shaped groove in core preform 30 of FIG. 4. For example, U-shaped apertures can be formed by grinding U-shaped grooves in a core preform, inserting the preform into a tube, and then heating the assembly to collapse the tube and shrink it onto the preform. If desired, the apertures can be subjected to a mild etch to smooth the walls thereof, the etching step being insufficient to enlarge and change the aperture shape to round. A strong etchant such as $NF_3$ can change the aperture shape to round.

Figure 11:
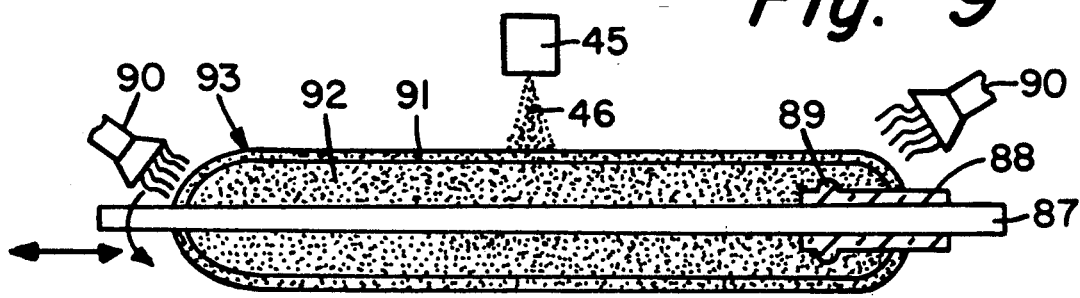
FIG. 11 is a cross-sectional view illustrating the application of first and second coatings of porous glass to a mandrel.

The following example illustrates the manner in which the method of the present invention can be employed to produce polarization retaining single-mode optical fibers. An optical fiber core preform was formed by a method similar to that disclosed in U.S. Pat. No. 4,486,212 which is incorporated herein by reference. Referring to FIG. 11, the large diameter end of an alumina mandrel 87 was inserted into glass tube 88. The outside diameter of the mandrel tapered from 5.5 mm to 6.5 mm over its 107 cm length. The ends of mandrel 87 were mounted in a lathe where it was rotated and translated.

The face of burner 45, which was of the type disclosed in U.S. Pat. No. 4,165,223, was positioned 13.7 cm from mandrel 87. Reactant compounds emanating from the central burner orifice were oxidized in the flame to form glass particle stream 46. Auxiliary burners 90 directed flames toward the ends of the porous glass preform during deposition. The use of auxiliary burners is taught in U.S. Pat. No. 4,810,276.

The system for delivering the gas-vapor mixture to the burner was similar to that disclosed in U.S. Pat. No. 4,314,837. Liquid $SiCl_4$ was maintained at 79° C. in a first container, and liquid $GeCl_4$ was maintained at 100° C. in second container, thus producing vapor at about 20 psi. During the deposition of the preform, vapors were metered from the first and second containers and were premixed with oxygen before being supplied to the burner.

The burner traversed a 49 cm section of mandrel in 25 seconds. An acetylene torch supported on the burner was first employed to deposit carbon particles on mandrel 87 during one burner pass to facilitate removal of the porous preform. A porous core preform 93 was then formed by traversing burner 45 along mandrel 87 many times with respect to burner 45 to cause a build-up of many layers of soot. During the entire 310 minute run, $SiCl_4$ flowed to burner 45 at a rate of 0.9 slpm. During the 300 minute deposition of core region 92, $GeCl_4$ flowed to the burner in accordance with the following schedule: (a) 0.75 slpm during the first 150 minutes, (b) a linear ramp from 0.75 to 0.65 slpm during the next 50 minutes, (c) a linear ramp from 0.65 to 0.53 slpm during the next 50 minutes, and (d) a linear ramp from 0.53 to 0.13 slpm during the next 50 minutes. The $GeCl_4$ was turned off, and only 0.9 slpm $SiCl_4$ flowed to the burner during the last 10 minutes of the run to form thin silica coating 91.

The preform was removed from the lathe, and the mandrel was removed through tube 88, thereby leaving a longitudinal aperture in the porous preform. Protrusions 89 caused tube 88 to adhere to the preform; that tube remained at one end of the preform to provide support for subsequent processing. The preform was then dried and consolidated in accordance with the teachings of U.S. Pat. No. 4,125,388. A short length of capillary tube was inserted into the bottom of the porous preform aperture. A drying gas consisting of 5 volume percent chlorine and 95 volume percent helium was flowed through tube 88 and into the preform aperture. A helium flushing gas flowed upwardly through the consolidation furnace muffle. The preform was gradually lowered into a consolidation furnace muffle, thereby forming a consolidated preform having a diameter of 52 mm.

The consolidated preform was inserted into the draw apparatus of FIG. 5 where its tip was heated to 1900° C. A vacuum connection was affixed to its upper end. After the end of the preform was stretched so that its aperture was either very narrow or completely closed, the aperture was evacuated. As the lower end of the preform was pulled downwardly at a rate of about 15 cm/min, and its diameter decreased, the evacuated aperture collapsed. The diameter of the resultant rod was 6 mm.

A plurality of 90 cm sections were severed from the rod, and one of the sections was supported in a lathe where it functioned as a mandrel for the deposition of additional silica cladding soot. This outer cladding was formed by flowing SiCl$_4$ vapor to the burner at a rate of 2 slpm for 300 minutes. This overclad process continued until a coating of SiO$_2$ soot having an outside diameter of 70 mm was deposited to form a composite preform. The composite preform was consolidated at 1450° while a mixture of 98.75 volume percent helium and 1.25 volume percent chlorine flowed upwardly through the muffle. The resultant consolidated core preform had a diameter of 40 mm and a core diameter of about 6 mm.

A grinding wheel was employed to form longitudinal grooves 34 in cladding 32 on opposite sides of core 31 of the resultant preform 30 (FIG. 4). The groove dimensions were 0.5 inch (1.27 cm) wide by 0.375 inch (9.5 mm) deep. Before stretching, the grooved preform etched and rinsed. The grooved core preform was inserted into the apparatus of FIG. 5 where its tip was heated to 1900° C. Grooved rod 41, having an outside diameter of 5 mm, was drawn from preform 30. Rod 41 was severed into 30 cm sections 42 which were cleaned with HF for 20 minutes and rinsed in deionized water.

One end of a 100 cm long piece of silica cladding tube 47 having a 5.3 mm inside diameter and 8 mm outside diameter was tapered at end 49 (FIG. 7), and silica plug 50 was fused to the tapered end. The ends of the resultant structure were mounted in a lathe where it was rotated and translated with respect to flame hydrolysis burner 45 (FIG. 6). Particles 46 of SiO$_2$ soot entrained in the burner flame were deposited on tube 47 to build up a 1000 gram coating 48 having a length of 70 cm and an outside diameter of 70 mm. The grooved core preform 42 was inserted into the opposite end of tube 47 until it contacted the tapered end. End 54 of tube 47 was tapered and was then fused to handle 55. While assembly 52 was rotated at 1 rpm, it was lowered into consolidation furnace muffle 51 at a rate of 5 mm per minute. During consolidation, assembly 52 was subjected to a temperature of 1460° C., and a gas mixture comprising 400 cc chlorine and 20 lpm helium flowed upwardly through the muffle. As soot coating 48 consolidated, it forced tube 57 inwardly against section 42, and the contacting surfaces of tube 57 and section 42 became fused. An end was severed from the consolidated preform to form planar endface 63 (FIG. 10).

Tubing 62 was inserted into handle 55, and 50% HF was pumped through apertures 57 to enlarge them (see FIG. 9). Assembly 58 was periodically checked with a tapered gauge to ascertain the size of the apertures. The minimum cross-sectional dimension of apertures 57, which was initially 0.8 mm, was enlarged to 2.5 mm after about 12 hours of etching. The assembly was then rinsed in deionized water and allowed to dry.

The resultant draw blank was inserted in a draw furnace, and a vacuum attachment was connected to its handle. With the furnace temperature set at 2050° C., a polarization retaining single-mode optical fiber was drawn at a rate of 3 m/sec. The circumference of the fiber was round. While the fiber was being drawn, two acrylate coatings were applied to it to form a 172 $\mu$m thick composite coating.

The core dimensions along its major and minor axes were 3.5 $\mu$m and 0.6 $\mu$m, respectively; its aspect ratio was 5.8:1. The outside diameter of the fiber was 80 $\mu$m. The attenuation of the fiber was 8 dB/km at 780 nm. The beat length was 0.9 mm and the h parameter was equal to or less than $2 \times 10^{-5}$.

A similarly formed fiber exhibited a beat length of 2.2 mm at 1550 nm and an attenuation of 1.3 dB/km at 1500 nm.

I claim:

1. A method of making a polarization retaining single-mode optical fiber comprising drawing an optical fiber from a cylindrically-shaped draw blank having a cylindrically-shaped glass core surrounded by cladding glass and having apertures consisting of a single pair of cylindrical apertures that are parallel to and diametrically opposed with respect to said core, said fiber being drawn at such a rate that said apertures close, thus causing the core of said fiber to have an elliptical cross-section.

2. A method according to claim 1 wherein the cross-sectional area of each of said apertures is such that the cross-section of said fiber is circular.

3. A method according to claim 1 wherein the cross-sectional area of each of said apertures is such that the outer surface of said fiber has two opposed sides that are flatter than the remainder of said fiber.

4. A method according to claim 1 wherein said apertures are evacuated during the step of drawing.

5. A method according to claim 1 wherein said draw blank is formed by forming longitudinal grooves on diametrically opposed sides of a cylindrically-shaped core preform in which said glass core is surrounded by said cladding glass, inserting said core preform into a glass tube to form an assembly having enclosed grooves on diametrically opposed sides of said core, shrinking said tube onto said core preform, fusing said core preform to said tube to thereby form a consolidated assembly containing said apertures, and removing a portion of said core preform adjacent said grooves and a portion of said tube adjacent said grooves to enlarge the cross-sectional area of said enclosed grooves and form said apertures.

6. A method according to claim 5 wherein the step of enlarging comprises flowing an etchant through said apertures.

7. A method of making a polarization retaining single-mode optical fiber comprising the steps of forming longitudinal grooves on diametrically opposed sides of a cylindrically-shaped core preform having a glass core surrounded by cladding glass, inserting said core preform into a glass tube, shrinking said tube onto said core preform, fusing the interface between said core preform and said tube, thereby forming a consolidated assembly having longitudinal apertures that are parallel to said core to form a draw blank, and drawing an optical fiber from the resultant draw blank at such a rate that said apertures close, thus causing the core of said optical fiber to have an elliptical cross-section.

8. A method according to claim 7 wherein said tube has outer and inner surfaces and wherein, during the steps of shrinking and fusing, said method comprises applying a pressure differential across said tube, whereby the pressure on the outer tube surface exceeds that on the inner tube surface, the pressure differential across said tube being sufficient to collapse said tube onto said core preform, but being insufficient to cause glass to flow into and eliminate said grooves.

9. A method according to claim 7 wherein the steps of shrinking and fusing comprise depositing glass particles on the outer surface of said tube, and heating and consolidating said particles, thereby exerting on said tube a radially inwardly directed force that causes said tube to shrink onto said core preform, the step of heating also fusing said tube to said rod.

10. A method according to claim 9 further comprising the step of flowing an etchant through said apertures to increase the cross-sectional areas thereof.

11. A method according to claim 10 wherein said apertures are evacuated during the step of drawing.

12. A method according to claim 9 wherein said apertures are evacuated during the step of drawing.

13. A method of making a polarization retaining single-mode optical fiber comprising the steps of forming longitudinal grooves on diametrically opposed sides of a cylindrically-shaped core preform having a glass core surrounded by cladding glass, depositing glass particles on the outer surface of a glass tube, inserting said core preform into said glass tube to form an assembly, heating said assembly to consolidate said particles, thereby exerting on said tube a radially inwardly directed force that causes said heated tube to shrink onto and fuse to said core preform, thereby forming a consolidated assembly having longitudinal apertures that are parallel to said core to form a draw blank, and drawing an optical fiber from the draw blank at such a rate that said apertures close, thus causing the core of said optical fiber to have an elliptical cross-section.

14. A method according to claim 13 wherein said apertures are evacuated during the step of drawing.

15. A method according to claim 13 further comprising the step of flowing an etchant through said apertures to increase the cross-sectional areas thereof.

16. A method according to claim 15 wherein said apertures are evacuated during the step of drawing.

17. A method of making a polarization retaining single-mode optical fiber comprising drawing an optical fiber from a cylindrically-shaped draw blank having a cylindrically-shaped glass core surrounded by cladding glass and having apertures that are parallel to and diametrically opposed with respect to said core, said fiber being drawn at such a rate that said apertures close, thus causing the core of said fiber to have an elliptical cross-section, said draw blank being formed by the following steps:

forming longitudinal grooves on diametrically opposed sides of a cylindrically-shaped core preform in which said glass core is surrounded by said cladding glass, inserting said core preform into a glass tube to form an assembly having enclosed grooves on diametrically opposed sides of said core, said tube having outer and inner surfaces, shrinking said tube onto said core preform to form said apertures, fusing said core preform to said tube, thereby forming a consolidated assembly containing said apertures, applying a pressure differential across said tube during the steps of shrinking and fusing, whereby the pressure on the outer tube surface exceeds that on the inner tube surface, the pressure differential across said tube being sufficient to collapse said tube onto said core preform, but being insufficient to cause glass to flow into and eliminate said grooves, the step of applying a pressure differential across said tube comprising depositing glass particles on the outer surface of said tube, heating the resultant assembly to consolidate said particles, the process of consolidating said particles exerting a force radially inwardly on said tube, thereby causing said tube to shrink onto said core preform, the step of heating also fusing said tube to said core preform.

* * * * *